(12) United States Patent
Zhou et al.

(10) Patent No.: US 6,385,064 B1
(45) Date of Patent: May 7, 2002

(54) HARMONIC BLOCKING REACTOR FOR NINE-PHASE CONVERTER SYSTEM

(75) Inventors: Dongsheng Zhou, Cedarburg; Gary L. Skibinski, Milwaukee; Walt A. Maslowski, Oak Creek; Brian R. Buchholz, Pewaukee; Bruce A. Hachey, Milwaukee; Nickolay N. Guskov, Mequon, all of WI (US)

(73) Assignee: Rockwell Technologies, LLC, Milwaukee, WI (US)

( * ) Notice: Subject to any disclaimer, the term of this patent is extended or adjusted under 35 U.S.C. 154(b) by 0 days.

(21) Appl. No.: 09/850,479

(22) Filed: May 7, 2001

(51) Int. Cl.[7] .................................................. H02M 1/12
(52) U.S. Cl. ......................................... 363/44; 363/67
(58) Field of Search .............................. 363/39, 40, 44, 363/123, 125, 126, 127, 128, 64, 65, 67, 69, 70, 71; 323/205

(56) References Cited

U.S. PATENT DOCUMENTS

| | | | |
|---|---|---|---|
| 3,792,286 A | 2/1974 | Meier | 363/71 X |
| 4,204,264 A | 5/1980 | Lipman | 363/71 |
| 5,446,642 A | 8/1995 | McMurray | 363/40 |
| 5,455,759 A | * 10/1995 | Paice | 363/126 |
| 6,101,113 A | 8/2000 | Paice | 363/126 |

* cited by examiner

Primary Examiner—Jessica Han
(74) Attorney, Agent, or Firm—Quarles & Brady LLP

(57) ABSTRACT

A nine-phase AC to DC power converter system may exhibit current unbalance problem among bridges due to two reasons: slight voltage magnitude difference among different sets of three-phase supplies and pre-existing voltage harmonics in the power supply lines. Since the unpredictability of the pre-existing harmonics and manufacturing uncertainty of the nine-phase power supply (it is usually a three to nine phase transformer), all devices in the rectifier bridges are required to carry much higher than necessary current magnitude and have to be designed oversize, as much as 100% up. Here we describe various topologies of harmonic blocking reactors to combat this problem. The described topologies can significantly improve this situation and thus avoid the over-sizing exercise (cost) when such converter system is built. The principle can be easily extended to any multi-phase AC to DC or DC to AC power conversion system of more than nine phases. The principle can be extended to any multi-phase converter system with more than nine phases.

26 Claims, 8 Drawing Sheets

HARMONIC BLOCKING REACTOR FOR NINE-PHASE CONVERTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is AC to DC converter systems and more specifically a blocking reactor including three cores for blocking harmonic currents in a nine-phase converter system.

Rectifiers are used to rectify AC voltages and generate DC voltages across DC buses. A typical rectifier includes a switch-based bridge including two switches for each AC voltage phase which are each linked to the DC buses. The switches are alternately opened and closed in a timed fashion that, as the name implies, causes rectification of the AC voltage. As well known in the energy industry the global standard for AC power distribution is three-phase and therefore three-phase rectifier bridges are relatively common.

When designing a rectifier configuration there are three main considerations including cost, AC line current harmonics and DC bus ripple. With respect to AC current harmonics, when an AC phase is linked to a rectifier and rectifier switches are switched, the switching action is known to cause harmonics on the AC lines. AC line harmonics caused by one rectifier distort the AC voltages provided to other commonly linked loads and therefore should generally be limited to the extent possible. In fact, specific applications may require that large rectifier equipment be restricted in the AC harmonics that the equipment produces.

With respect to DC link ripple, rectifier switching typically generates ripple on the DC bus. With respect to cost, as with most hardware intensive configurations, cost can be minimized by using a reduced number of system components and using relatively inexpensive components where possible.

The most common and available type AC to DC converter is a three-phase rectifier system including six semiconductor switches arranged to form a converter that links three AC input lines to positive and negative DC buses where the voltage on the input lines is spaced by 120 electrical degrees. This type of six-switch converter system exhibits relatively high DC output voltage ripple at a frequency that is six times the AC line frequency. For example, where the line frequency is 60 Hertz, the ripple is typically 360 Hertz. Converters that include six switches are generally referred to as six-pulse rectifiers.

It is well known in AC to DC rectification that AC current harmonics and DC ripple may be improved by increasing the number of AC phases that are rectified where the AC phases are phase-shifted from each other. For example, by rectifying nine-phase AC current instead of three-phase currents, harmonics and ripple are reduced appreciably. To rectify nine phase currents the industry most solutions employ three three-phase rectifiers, each of the three rectifiers including six switches arranged to form a bridge between each of three of the AC supply lines and DC rectifier outputs. The outputs can be linked in several different fashions to provide one positive DC bus and one negative DC bus as described in more detail below. Three rectifier configurations that include a total of 18 switches are generally referred to as 18 pulse rectifiers.

As the global standard for AC power distribution is three-phase, a mechanism for converting three-phase current to nine-phase current is necessary prior to rectification via any 18-pulse rectifier. To this end the industry has devised several different three to nine-phase transformer configurations. An exemplary three to nine-phase transformer and rectifier configuration is illustrated in FIG. 1 including a transformer 100, and first, second and third rectifiers 120, 140 and 160, respectively, that link three AC supply lines 122, 124 and 126 to positive and negative DC buses 128 and 180, respectively. Transformer 100 receives three 120 degree phase shifted AC currents $I_A$, $I_B$ and $I_C$ on input lines 122, 124 and 126 and provides nine AC output currents $I_1$ through $I_9$ on nine AC output lines (not numbered) where the output currents include three currents $I_4$–$I_6$ that are in phase with the input currents, three currents $I_1$–$I_3$ that lag the input currents by 20 degrees and three currents $I_7$–$I_8$ that lead the input currents by 20 degrees.

Currents $I_1$ through $I_3$, currents $I_4$ through $I_6$ and currents $I_7$ through $I_9$ are provided to rectifiers 120, 140 and 160, respectively. The outputs of rectifiers 120, 140 and 160 are linked together in parallel. The rectifier input currents $I_1$–$I_9$ are summed together to produce a primary current $I_A$ through $I_C$ having reduced harmonics. Because the pre-rectified voltages $V_1$–$V_3$, $V_4$–$V_6$ and $V_7$–$V_9$ are spaced out 20 degrees, their rectified DC voltages fill each other's valleys and hence produce an 18 times fundamental frequency ripple that is relatively smoother when compared to six-switch configurations.

In theory 18 pulse systems like the one illustrated in FIG. 1 have the advantage that each rectifier needs only include components having a power rating corresponding to one third the overall DC output power rating. Thus, in theory 18-pulse rectifier switches in parallel linked configurations can be one third the size of switches required for six pulse rectifiers.

In reality, however, for two reasons the rectifier components have to be greater than the theoretical one-third rated DC size. First, due to manufacturing limitations, slight magnitude differences occur in most cases among the rectifier input voltages. These slight voltage magnitude differences produce slight DC voltage differences at each of the separate rectifier outputs. For example, DC output voltage variance among rectifier outputs is often within the range of 0 to 2 volts.

Converter systems are typically constructed for very low impedance to provide a stiff voltage source to a load. For this reason the slight differences in DC voltage, although small in most cases, cause the rectifier with highest output DC voltage to carry much more DC load current when compared with the current carried by the other rectifiers.

Second, referring again to FIG. 1, in a typical application the three-phase power source would be linked to many loads like the one illustrated and each of those loads would cause some degree of harmonic distortion on supply lines 122, 124 and 126. As known in the industry, the rectified DC voltage for a single three-phase bridge with pre-existing $5^{th}$ and $7^{th}$ harmonics is:

$$V_{dc} = \frac{3\sqrt{3}}{2\pi} V_1 \left(1 - \frac{1}{5}\frac{V_5}{V_1}\cos\phi_5 - \frac{1}{7}\frac{V_7}{V_1}\cos\phi_7\right) \quad \text{Eq. 1}$$

with $$V_A = V_1 \sin \omega t + V_5 \sin(5\omega t + \phi_5) + V_7 \sin(7\omega t + \phi_7) \quad \text{Eq. 2}$$

$$V_B = \quad \text{Eq. 3}$$
$$V_1 \sin\left(\omega t - \frac{2\pi}{3}\right) + V_5 \sin\left(5\omega t + \phi_5 + \frac{2\pi}{3}\right) + V_7 \sin\left(7\omega t + \phi_7 - \frac{2\pi}{3}\right)$$

$$V_C = \quad \text{Eq. 4}$$
$$V_1 \sin\left(\omega t + \frac{2\pi}{3}\right) + V_5 \sin\left(5\omega t + \phi_5 - \frac{2\pi}{3}\right) + V_7 \sin\left(7\omega t + \phi_7 + \frac{2\pi}{3}\right)$$

Equation 1 indicates that both the magnitude and angle of the harmonic voltages influence the DC voltage. As obvious from FIG. 1, the rectifier input voltages $V_1$–$V_3$, $V_4$–$V_6$ and $V_7$–$V_9$ are spaced out 20 degrees. Thus the values of the harmonic angles (see Equations 1 through 4) for each rectifier 12, 14 and 16, are changed causing the rectified DC voltages from each rectifier to be different. Thus, the pre-existing harmonics also contribute to current unbalance among different rectifiers.

In order to avoid such unbalance problem, one solution is to connect all three bridges in series, instead of in parallel. Referring again to FIG. 1, this type of configuration would include a link between the lower DC output of rectifier 120 and the upper output of rectifier 140, a link between the lower DC output of rectifier 140 and the upper DC output of rectifier 160 and the DC output buses would include the top and bottom DC output leads of rectifiers 120 and 160, respectively. In this case, to achieve the DC output voltage level provided by the parallel configuration described above, the magnitude of each nine-phase voltage $V_1$–$V_9$ would only have to be one-third that of the parallel configuration. Unfortunately, each rectifier 120, 140 and 160 would have to carry the full rated current and therefore the switching devices therein would have to be full-size and relatively expensive.

Other attempts to solve the unbalance problems have employed inter-phase transformers (IPT) having six separate cores between the rectifiers and the DC output rails in parallel rectifier configurations. Unfortunately, with these configurations, each IPT must carry the full DC current generated by the rectifier linked thereto and therefore each IPT must include an air gap adjustment which means that each IPT would be relatively large. In conversion systems where space is limited such excessive space requirements are impractical.

In addition, when one of the rectifiers is out of service for any reason (e.g., a fault condition occurs), the four IPTs corresponding to the other two bridges automatically go into saturation which nullifies the effect of the IPTs entirely.

Yet other attempts to avoid unbalance problems in parallel rectifier configurations have employed harmonic blocking reactors on the AC side of the rectifiers. For example, some efforts have resulted in configurations including three separate reactors that cancel various (e.g., $5^{th}$ and $7^{th}$) voltage harmonics for a six-phase DC to AC system. Other efforts have taught that harmonics in a nine-phase system can be cancelled by adjusting different turn ratios among windings in each of six separate reactors. An exemplary nine phase AC side reactor configuration is illustrated in FIG. 2. In these cases, advantageously, the reactor cores do not need to carry fundamental flux and do not have the saturation problems associated with IPTS. Unfortunately configurations, like the configuration of FIG. 2, that employ AC side reactors have not proven to be much better than the IPT attempts as each attempt requires six separate cores that render required hardware bulky and relatively expensive.

Another AC side reactor configuration is taught by U.S. Pat. No. 4,204,264 in FIG. 3 and includes two separate three-phase cores for a nine-phase AC to DC system. Here instead of using six separate cores as in FIG. 2, six limbs from the two separate cores are employed. While a better effort, this two-core solution still requires a relatively large amount of material to accommodate a nine-phase converter system. In addition, because three-phase cores are used triple harmonic fluxes cannot circulate within the core and the configuration therefore does not eliminate the triple harmonics. Thus, it would be advantageous to configure an AC side harmonic blocking reactor that requires a reduced set of cores, reduces triple harmonics and for which saturation is not a problem.

BRIEF SUMMARY OF THE INVENTION

The present invention is a reactor for linking a multiphase transformer to a rectifier, where the multiphase transformer generates a multiphase AC output signal comprising a plurality of three phase signals. Each of the three phase signals comprises a first, a second and a third output current of substantially similar magnitude, and each of the first, second, and third output currents are spaced one hundred and twenty degrees apart. The first, second, and third output currents of each of the three phase signals are offset from the first, second, and third output currents of another of the three phase signals by a predetermined angle, respectively. The rectifier is for receiving and rectifies the multiphase AC output signals to provide positive and negative DC bus currents. The reactor comprises first, second and third cores and a plurality of winding subsets, the plurality of winding subsets being equal in number to the plurality of three phase signals. Each winding subset includes at least first, second and third windings linked to the first, second and third outputs of the corresponding three phase signal. The windings are arranged on the cores such that at least a winding segment from each of the plurality of winding subsets is wound about each of the first, second and third cores.

In one embodiment of the invention the transformer generates AC output currents having substantially similar magnitudes on each of nine outputs. The first, second and third output currents spaced one hundred and twenty degrees apart, the fourth, fifth and sixth output currents leading the first, second and third output currents by a predetermined angle, respectively, the seventh, eighth and ninth output currents lag the first, second and third output currents by substantially the predetermined angle, respectively. The rectifier receives and rectifies nine phase AC currents to provide positive and negative DC bus currents. The reactor comprises three cores and three winding subsets. The first winding subset includes at least first, second and third windings linked to the first, second and third outputs. The second winding subset including at least first, second and third windings linked to the fourth, fifth and sixth outputs. The third winding subset including at least first, second and third windings linked to the seventh, eighth and ninth outputs. The windings arranged on the cores such that at least a winding segment from each of the first, second and third winding subsets is wound about each of the first, second and third cores.

The windings of the harmonic reactor of the present invention are preferably sized and dimensioned such that, when receiving AC currents at a fundamental frequency, current passing through each winding generates flux within the core such that the fundamental fluxes through the core cancel. The reactor, however, provides impedance to higher order harmonics, thereby providing a blocking function.

In one embodiment of the invention, the reactor is preferably wound such that each of the first, second and third subset first windings are wound about the first core, the first, second and third subset second windings are wound about the second core and the first, second and third subset third windings are wound about the third core. The ratio of the first subset windings to the second and third subset windings on each core is one to one over two times the cosine of the predetermined angle. For a predetermined angle of twenty degrees, and the ratio of first subset windings to second and third subset windings on each core is substantially 1:0.532:0.532.

In another embodiment of the invention, the reactor can be configured such that the first subset first winding, the second subset second winding and the third subset third winding are wound about the first core, the first subset second winding, the second subset third winding and the third subset first winding are wound about the second core and the first subset third winding, the second subset first winding and the third subset second winding are wound about the third core. Again, the ratio of the first subset windings to the second and third subset windings on each core is one to one over two times the cosine of two times the predetermined angle. Here for a predetermined angle of substantially 20 degrees, the ratio of first subset windings to second and third subset windings on each core is substantially 1:0.6527:0.6527.

The reactor of the present invention can also be configured such that the first winding subset includes a single coil, while the second and third winding subsets include first and second coils. Here the first subset first winding, first coil of the second subset first winding, first coil of the second subset second winding, first coil of the third subset first winding and first coil of the third subset third winding are each wound about the first core. The first subset second winding, second coil of the second subset second winding, first coil of the second subset third winding, second coil of the third subset first winding and first coil of the third subset second winding are wound about the second core. The first subset third winding, second coil of the second subset first winding, second coil of the second subset third winding, second coil of the third subset second winding and second coil of the third subset third winding are wound about the third core.

In this embodiment, the reactor can be configured such that the turns ratios of the first subset first winding to the second subset first winding first coil, second subset second winding first coil, third subset first winding first coil and third subset third winding first coil are two to one over two times the cosine of the phase angle between the current linked to the first subset first winding and the current linked to the respective coil. The turns ratios of the first subset second winding to the second subset second winding second coil, second subset third winding first coil, third subset first winding second coil and third subset second winding first coil are two to one over two times the cosine of the phase angle between the current linked to the first subset second winding and the current linked to the respective coil. The turns ratios of the first subset third winding to the second subset first winding second coil, second subset third winding second coil, third subset second winding second coil and third subset third winding second coil are two to one over two times the cosine of the phase angle between the current linked to the first subset first winding and the current linked to the respective coil. This configuration is dimensioned to cancel fundamental flux in each core.

For a predetermined angle of twenty degrees, the turns ratio of the first subset first winding to second subset first winding first coil and second winding first coil is substantially 2:0.532:0.6527, respectively. The turns ratio of the first subset first winding to third subset first winding first coil and third winding first coil is substantially 2:0.532:0.6527, the turns ratio of the first subset second winding to second subset second winding second coil and third winding first coil is substantially 2:0.532:0.6527, respectively, the turns ratio of the first subset second winding to third subset first winding second coil and second winding first coil is substantially 2:0.532:0.6527, the turns ratio of the first subset third winding to second subset first winding second coil and third winding second coil is substantially 2:0.6527:0.532, respectively, and the turns ratio of the first winding second coil is substantially 2:0.6527:0.532.

The reactor of the present invention can also be configured such that each core forms at least one continuous flux path. The cores can be configured as a single or double window, or to include a first, second and third cores forming first, second and third limbs on a four limb core configuration. In this configuration each limb includes first and second ends wherein, each of the first ends are linked and each of the second ends are linked.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 4:
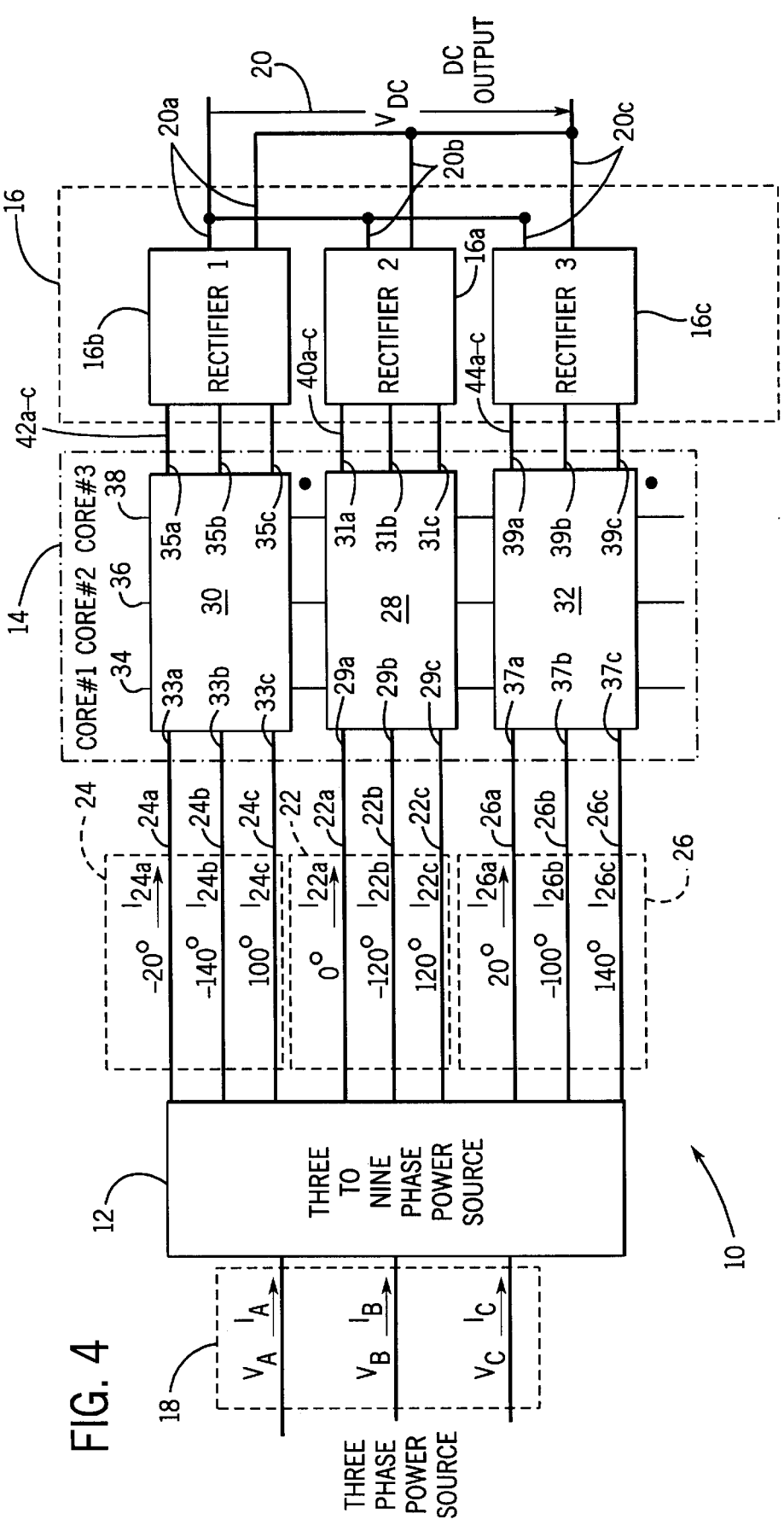
FIG. 4 is a blocking diagram of a power converter system including a harmonic blocking reactor constructed in accordance with the present invention.

Referring now to the Figures, and more particularly to FIG. 4, a block diagram of a power converter system 10 employing a harmonic blocking reactor 14 constructed in accordance with the present invention is shown. The power converter system 10 preferably comprises a multiphase transformer 12, harmonic blocking reactor 14, and rectifier circuit 16. The application will be described with reference to an eighteen pulse system, as described above. In this case, the multiphase transformer 12 is a three to nine phase transformer. It will be apparent, however, that the multiphase transformer can produce a twelve, fifteen, eighteen, or other multiple's of a three phase system. Regardless of the number of phases associated with the multiphase transformer 12, the transformer 12, harmonic blocking reactor 14, and rectifier circuit 16 are linked together to convert a three phase AC input 18 to a DC output signal 20, as will be described more fully below.

The three to nine phase transformer 12 receives the three phase AC input signal 18 and converts the signal to a nine phase signal comprising nine ac signals (22a–c, 24a–c, and 26a–c) of substantially equivalent magnitude at nine separate phase angles. The first, second, and third ac signals, 22a–22c, are preferably spaced substantially one hundred and twenty degrees apart. Each of the fourth, fifth, and sixth signals, 24a–24c, lag the first, second and third ac signals 22a–22c by a predetermined angle, respectively, and the seventh, eighth and ninth signals 26a–26c, lead the first, second and third ac signals by a substantially similar predetermined angle. The predetermined angle can be an angle of twenty degrees, as shown in the vector diagram of FIG. 5. However, it will be apparent to those of ordinary skill in the art that different angles can be produced by the three to nine phase transformer, and that the harmonic blocking reactor 14 of the present invention can be configured to accept signals at a number of varying phase angles. Hereafter the first, second, and third ac signals 22a–c may be referred to as the first set of ac signals 22, the fourth, fifth, and sixth ac signals 24a–c may be referred to as the second set of ac signals 24, and the seventh, eight, and ninth ac signals 26a–26c may be referred to as the third set of ac signals 26.

Figure 11:
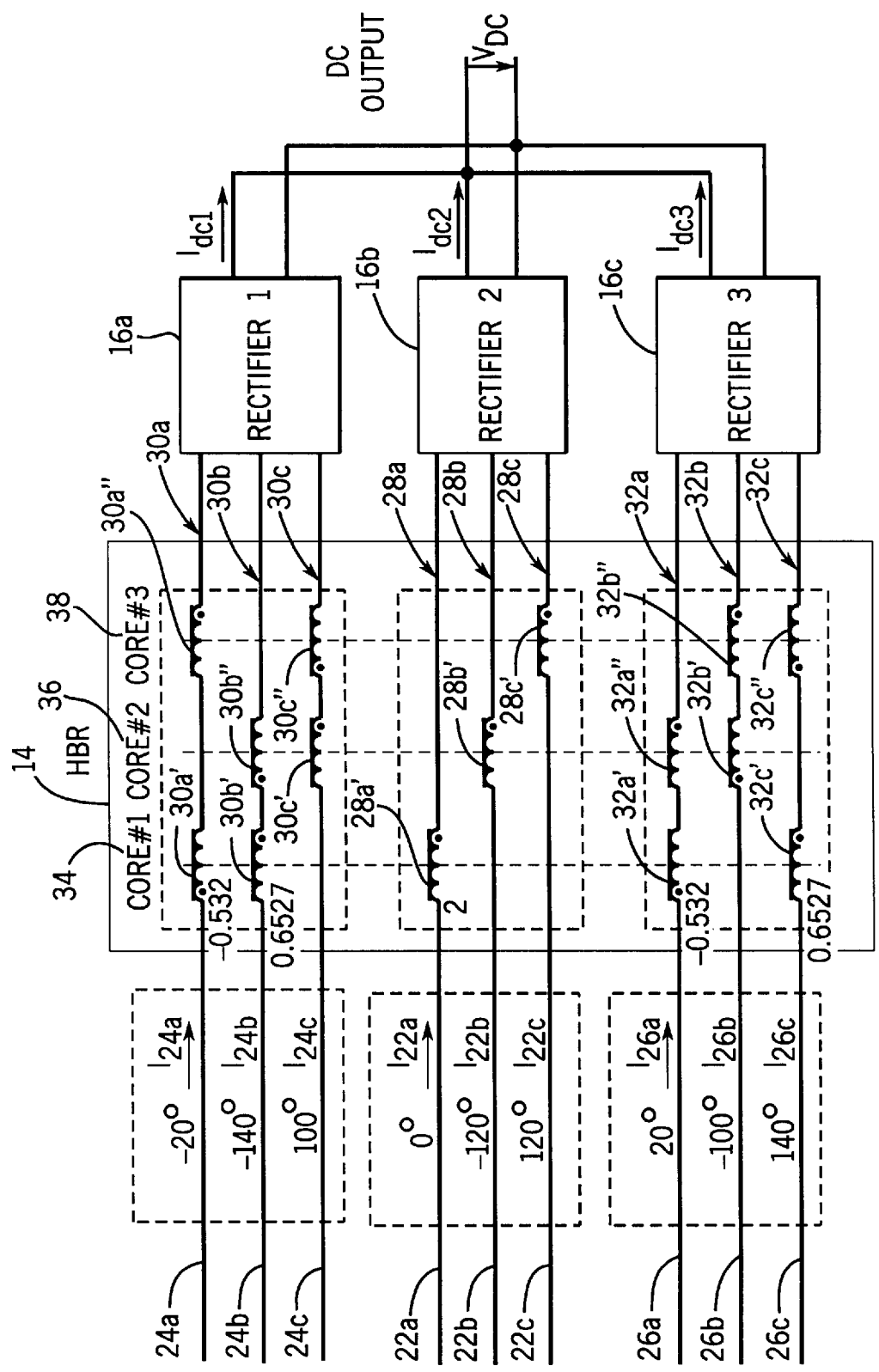
FIG. 11 is a block diagram of a third embodiment of a harmonic blocking reactor constructed in accordance with the present invention.

The harmonic blocking reactor 14 comprises a first, a second, and a third winding subset 28, 30, and 32, respectively, and a first, a second, and a third core 34, 36, and 38, respectively. The winding subsets 28, 30, and 32 each comprise at least a first, a second, and a third winding 28a–c, 30a–c, and 32a–c, respectively (see FIGS. 7, 9 and 11). Each winding comprises an input end 29a–c, 33a–c, and 37a–c, and an output end 31a–c, 35a–c, and 39a–c, respectively. The windings 28a–c, 30a–c, and 32a–c can each comprise a single coil (FIG. 7), or, in some applications, can include a first and a second coil linked in series, as will be described with reference to specific embodiments below (FIG. 11). It will be apparent to those of ordinary skill in the art that the number of winding subsets are determined based on the number of sets of three phase signals produced by the transformer 12. Thus, for example, when the multiphase transformer is a three to twelve phase transformer, a fourth winding subset comprising first, second, and third windings is required.

Figure 6A:
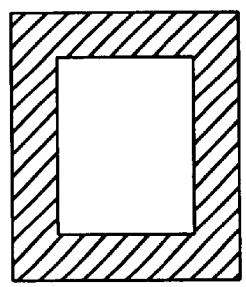
FIG. 6a is an illustration of a single window core for use in a harmonic blocking reactor constructed in accordance with the present invention.
Figure 6B:
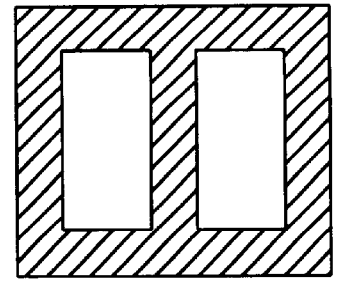
FIG. 6b is an illustration of a double window core for use in a harmonic blocking reactor constructed in accordance with the present invention
Figure 6C:
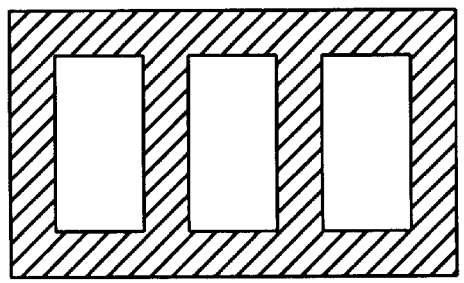
FIG. 6c is an illustration of a four limb core for use in a harmonic blocking reactor constructed in accordance with the present invention

The cores 34, 36, and 38 can be constructed in a number of known ways, but preferably comprise laminated steel. Although a number of different shapes can also be used, each core is preferably in the shape of either a single window, or a double window with a central limb, as shown in FIGS. 6a and 6b. In either application, to achieve maximum coupling, the windings are preferably wound along only one limb. An alternative core is shown in FIG. 6c. Here, the core has four limbs. Three of the limbs are used for windings and the remaining limb is used for individual flux passage. When the four limb core is used, a single core can be used rather than the three cores 34, 36, and 38 shown in FIG. 4. In the following discussion, however, three separate cores 34, 36, and 38 will be assumed.

In the harmonic blocking reactor 14, at least one coil of the first, second, and third windings 28a–28c of the first winding subset 28 is coupled to each of the first, second, and third cores 34, 36, and 38, respectively; at least one coil of the first, second, and third windings 30a–30c of the second winding subset 30 is coupled to each of the first, second, and third cores 34, 36, and 38, respectively; and at least one coil of the first, second, and third windings 32a–32c of the third winding subset 32 is coupled to each of the first, second, and third cores 34, 36, and 38, respectively. The windings coupled to each core 34, 36, and 38 are sized and dimensioned such that the flux induced in each of the cores 34, 36, and 38 cancels at the fundamental frequency, thereby providing an impedance of zero to signals at the fundamental frequency. The harmonic blocking reactor 14, however, provides an impedance to components of input signals at the higher harmonics, as described more fully below. Again, the theory as described is easily extended to a twelve phase or higher system. In this case, at least one winding from each additional winding subset is wound about each of the three cores 34, 36, and 38, and the windings are sized and dimensioned to cancel fundamental frequency at each core.

In the power converter system 10, each of the first set of ac input signals 22a–c is linked to the input end 29a–c of the first subset of windings 28a–c of the harmonic blocking reactor 14, respectively. Each of the second set of ac input signals 24a–c is coupled to the input end 33a–c of the second subset of windings 30a–c, respectively, and each of the third set of ac input signals 26a–c is coupled to the input end 37a–c of the third subset of windings 32a–c, respectively. The output of the harmonic blocking reactor 14 is a nine phase ac output signal (40a–c, 42a–c, and 44a–c), wherein each of these signals is associated with the output ends (31a–c, 35a–c, 39a–c) of the three winding subsets 28, 30, and 32, respectively.

The rectifier 16 receives nine phase ac output signal 40a–c, 42a–c, and 44a–cfrom the harmonic blocking reactor 14 and converts these signals to the dc signal 20. Preferably, the rectifier circuit 16 comprises three separate rectifiers 16a, 16b, and 16c, each of which receives and rectifies three of the nine ac output signals. The outputs 20a, 20b, and 20c of each of the rectifiers 16a, 16b, and 16c are tied together in a parallel configuration such that each of the rectifiers carries only one third of the total current in the power converter system 10. The parallel configuration allows the use of smaller rectifier components, thereby helping to reduce the size of the power converter system 10.

Figure 7:
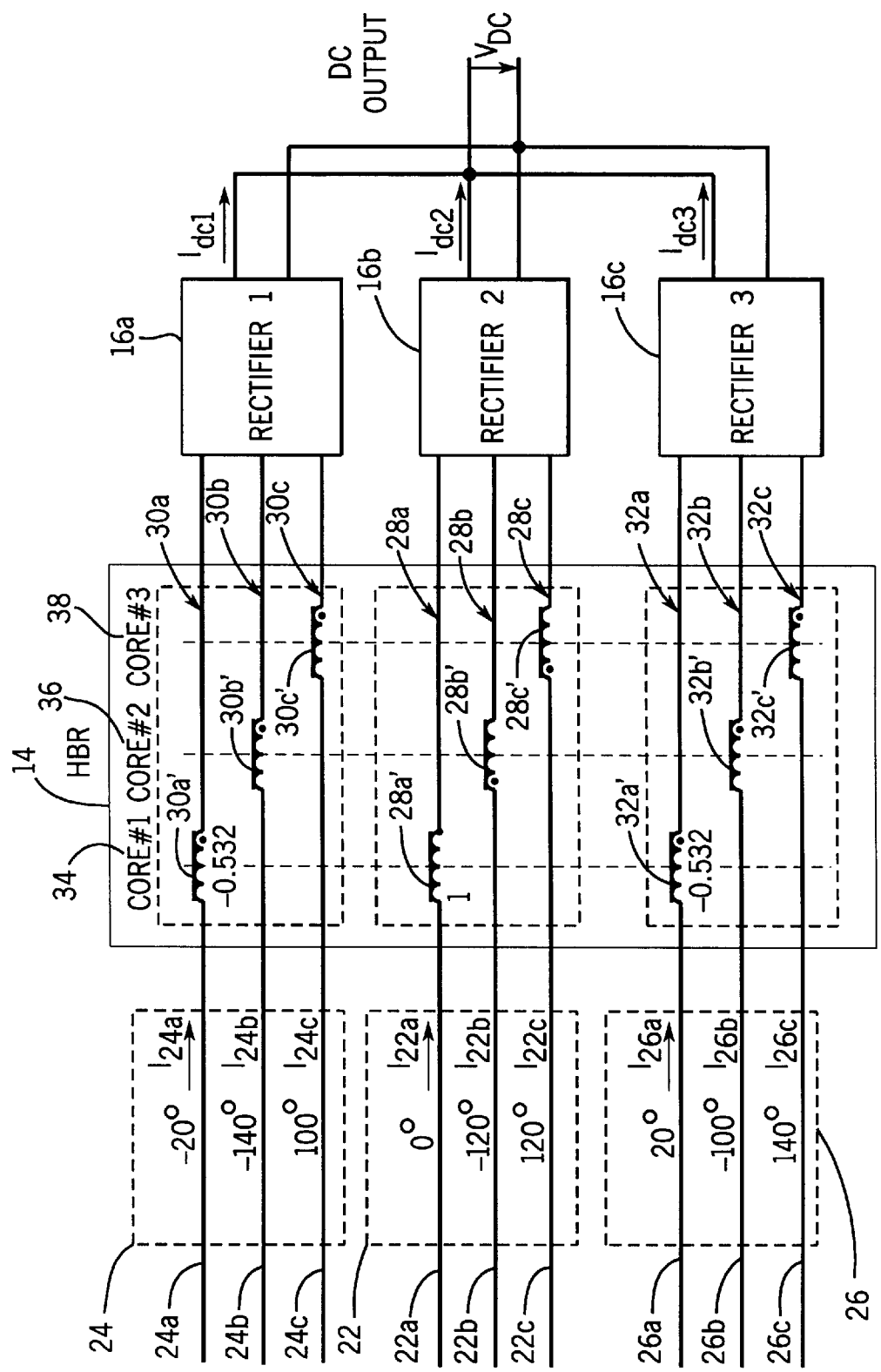
FIG. 7 is a block diagram of a first embodiment of a harmonic blocking reactor constructed in accordance with the present invention.

Referring now to FIG. 7, a first embodiment of a harmonic blocking reactor 14 constructed in accordance with the present invention is shown. The harmonic blocking reactor 14 comprises three cores 34, 36, and 38, as well as three winding subsets 28, 30, and 32. Each winding subset comprises first, second, and third windings 28a–c, 30a–c, and 32a–c, respectively, and each of the windings 28a–c, 30a–c, and 32a–c comprises a single coil 28a'–c', 30a'–c', and 32a'–c', respectively.

In this embodiment, the first, second, and third ac signals 22a, 22b, and 22c are linked to the first, second, and third windings 28a, 28b, and 28c of the first winding subset 28. Similarly, the fourth, fifth, and sixth ac signals 24a, 24b, and 24c are linked to the first, second, and third windings 30a, 30b, and 30c of the second winding subset 30 and the seventh, eighth, and ninth ac signals 26a, 26b, and 26c are linked to the first, second, and third windings 32a, 32b, and 32c of the third winding subset 30. The first winding (28a, 30a, and 32a) from each of the winding subsets 28, 30, and 32 is wound around the first core 34, the second winding (28b, 30b, and 32b) from each of the winding subsets 28, 30, and 32 is wound around the second core 36, and the third winding (28c, 30c, and 32c) from each of the winding subsets 28, 30, and 32 is wound around the third core 38.

Figure 1:
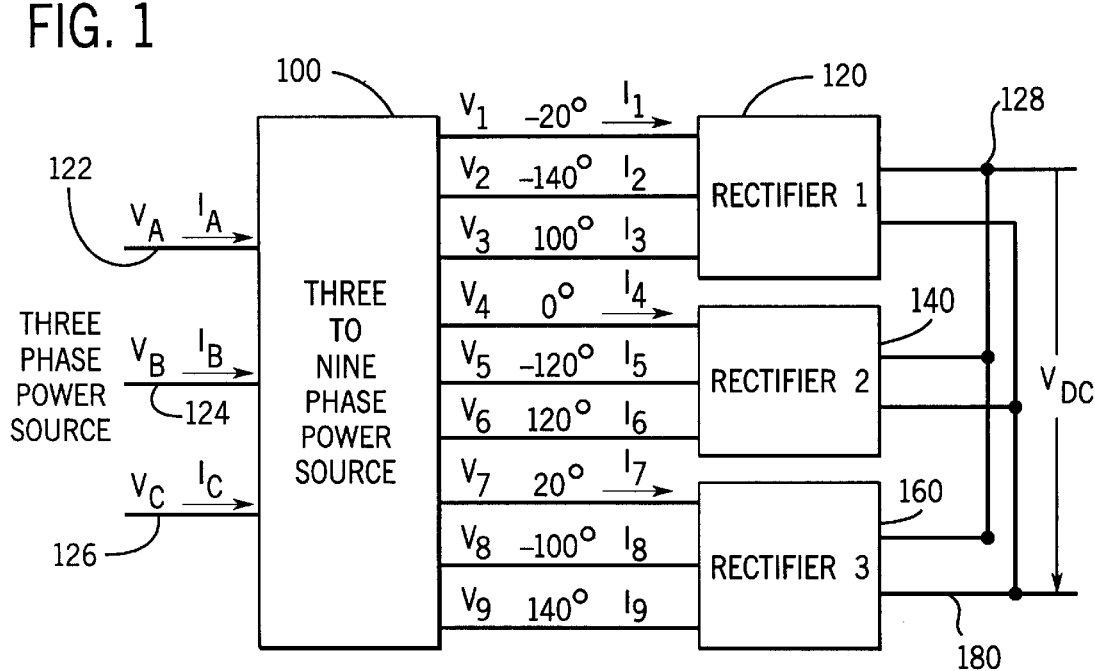
FIG. 1 is a block diagram of an eighteen pulse power converter system.
Figure 5:
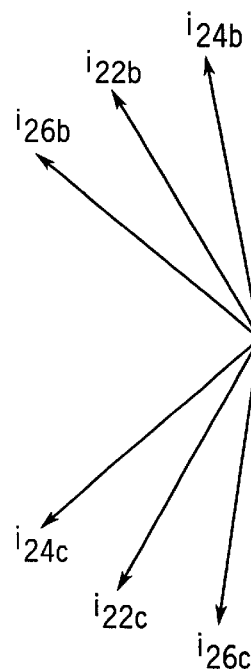
FIG. 5 is a vector diagram illustrating the polar distribution of the nine phase ac signal produced by the three to nine phase transformer of FIG. 4.

Referring again to FIG. 7, the ac signals coupled to the windings wound about each of the cores 34, 36, and 38 include one ac signal from the first set of ac signals 22, one from the second set of ac signals 24, and one from the third set of ac signals 26. For each core 34, 36, and 38, the ac signals from the second and third set of ac signals are selected to be the closest signals to the ac signal from the first set of ac signals 22. For example, for a nine phase input signal constructed as shown in FIG. 5, the ac signals coupled to the windings wound about the core 34, for example, include the signals 22a (zero degrees), 24a (twenty degrees) and 26a (negative twenty degrees). The windings wound around the cores 36 and 38 each also comprise three ac signals offset from each other by an angle of twenty degrees.

Figure 8:
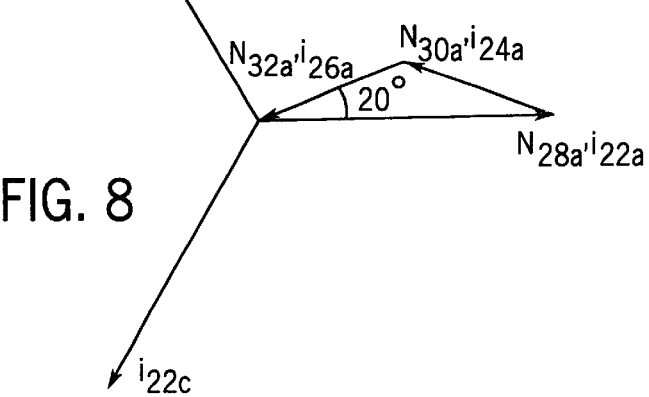
FIG. 8 is a vector diagram illustrating the amp turn linkage on a first core of the harmonic blocking reactor of FIG. 7.
Figure 2:
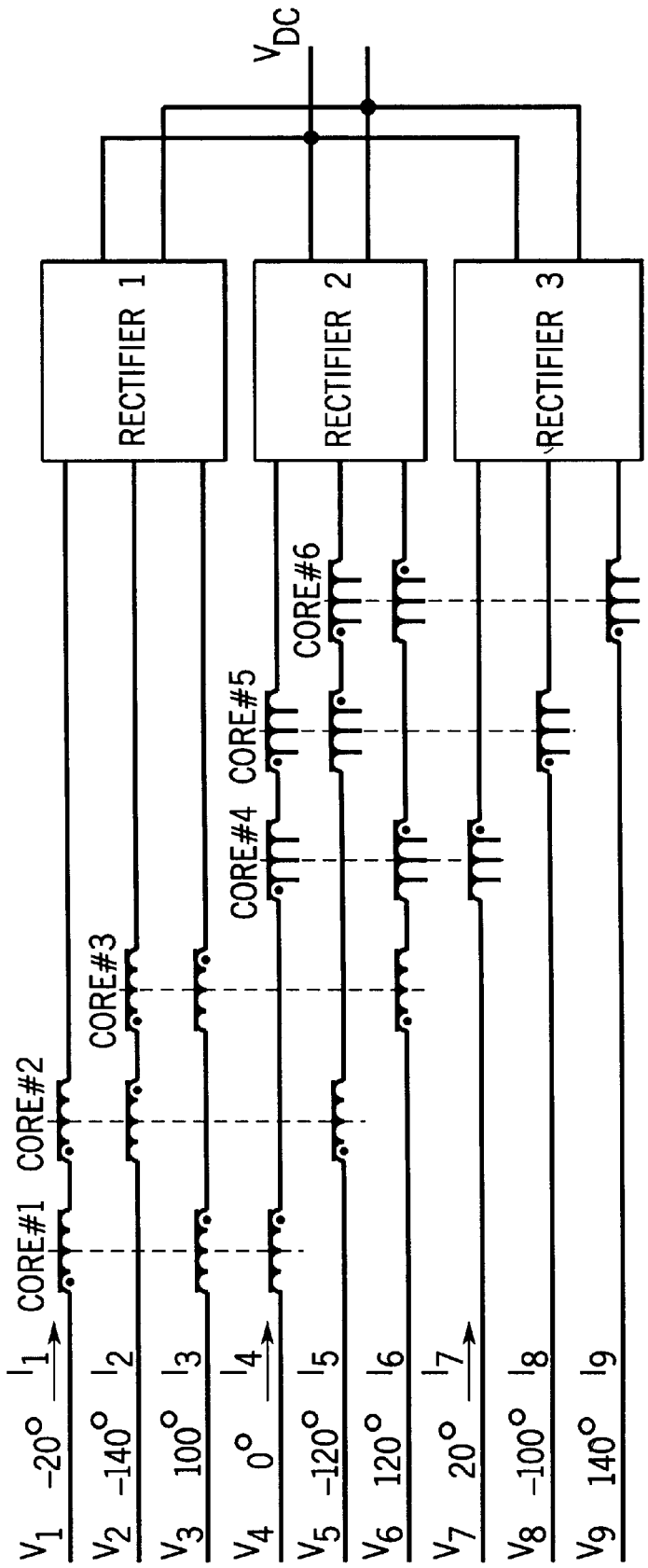
FIG. 2 is a prior art harmonic blocking reactor employing AC side reactors.
Figure 3:
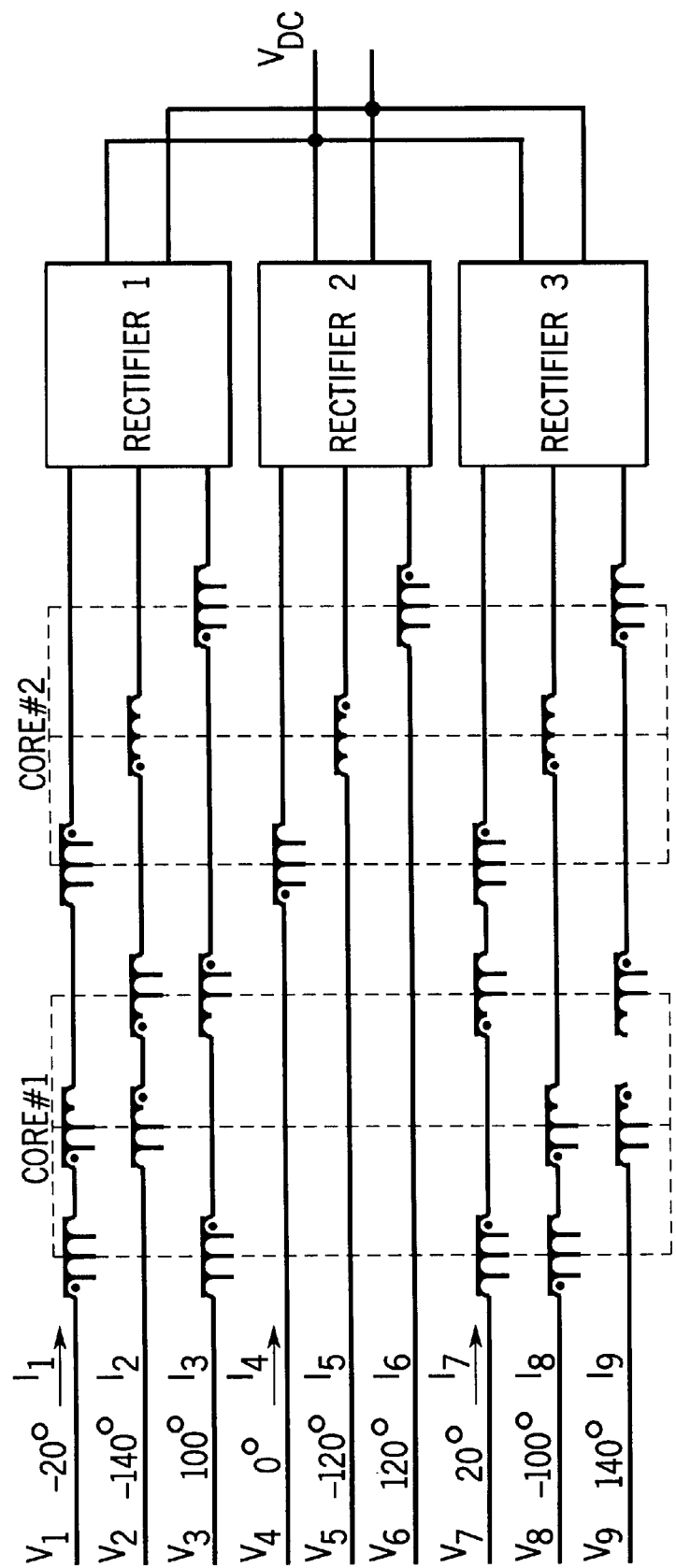
FIG. 3 is another prior art harmonic blocking reactor employing AC side reactors.

The winding turn ratio of the coils wound about each core 34, 36, and 38, is selected to cancel fundamental flux in the respective core. A vector diagram illustrating the cancellation of fundamental flux in the core 34 with the harmonic blocking reactor of FIG. 7 is shown in FIG. 8. Here, the coils wound around the core 34 are the coils 28a', 30a', and 32a'. Since the magnitude of the current flow of the ac signals in each of the coils is substantially equivalent, the turn ratio of the coils 28a', 30a', and 32a' must be dimensioned such that the sum of the amp turn vectors associated with each of the coils 28a', 30a', and 32a' is zero. The amp turn vectors are the product of the current flow into the coil ($i_x$) and the number of turns in a given coil ($N_x$). To achieve zero flux at fundamental frequency, the ampere turns $N_{30a}i_{24a}$ and $N_{32a}i_{26a}$ are constructed such that they form a loop against $N_{28a}i_{22a}$, as shown in FIG. 8. In general, the required turn winding ratio is:

$$\frac{N_{30a'}}{N_{28a'}} = \frac{N_{32a'}}{N_{29a'}} = \frac{1}{2\cos\theta} \qquad \text{Eq. 5}$$

where θ is the phase angle between the signals coupled to the windings on each core. For the specific embodiment where the fourth, fifth and sixth ac signals 24a–c lead the first, second, and third ac signals 22a–c by an angle of twenty degrees and the seventh, eighth, and ninth ac signals 26a–c lag the first, second, and third ac signals by an angle of twenty degrees, as shown in FIG. 3, the winding turn ratio is:

$$\frac{N_{30a'}}{N_{28a'}} = \frac{N_{32a'}}{N_{28a'}} = \frac{1}{2\cos 20°} \approx 0.532 \qquad \text{Eq. 6}$$

Referring again to FIG. 8, in this situation, a flux linkage (or so-called ampere turns) function can be established as:

$$g(\text{freq}) = -0.532 i_{24n} + i_{22n} - 0.532 i_{26n} \qquad \text{Eq. 6}$$

Referring now to Table 1, a chart illustrating the flux linkage for an assumed current value of one is shown at for low frequency harmonics on the power line. The flux linkage g( ) provides a zero impedance to the first (fundamental) frequency, and a non-zero impedance to higher order harmonics, as shown, and thus passes the fundamental frequency while blocking higher order harmonics. Note that, since the core construction provides passage for the triple harmonic fluxes, the harmonic blocking reactor is effective against these harmonics too.

TABLE I

Flux linkage for all low harmonics for construction according to Eq. 6

| Harmonics | −0.532 $I_{24a}$ | $I_{22a}$ | −0.532 $I_{26a}$ | g() |
|---|---|---|---|---|
| 1st | −0.532 ∠−20° | 1 ∠0° | −0.532 ∠20° | 0 |
| 3rd | −0.532 ∠−60° | 1 ∠0° | −0.532 ∠60° | 0.4679 |
| 5th | −0.532 ∠−100° | 1 ∠0° | −0.532 ∠100° | 1.185 |
| 7th | −0.532 ∠−140° | 1 ∠0° | −0.532 ∠140° | 1.8152 |
| 9th | −0.532 ∠−180° | 1 ∠0° | −0.532 ∠180° | 2.0642 |
| 11th | −0.532 ∠140° | 1 ∠0° | −0.532 ∠−140° | 1.8152 |
| 13th | −0.532 ∠100° | 1 ∠0° | −0.532 ∠−100° | 1.185 |

Table I shows that the impedance produced by the harmonic blocking reactor 14 of FIG. 7 is most effective against the 9th harmonic. It is known, however, that in most industrial applications, the 5th harmonic is dominant. This inspires us to seek for a construction that may present better impedance to the 5th harmonic.

Figure 9:
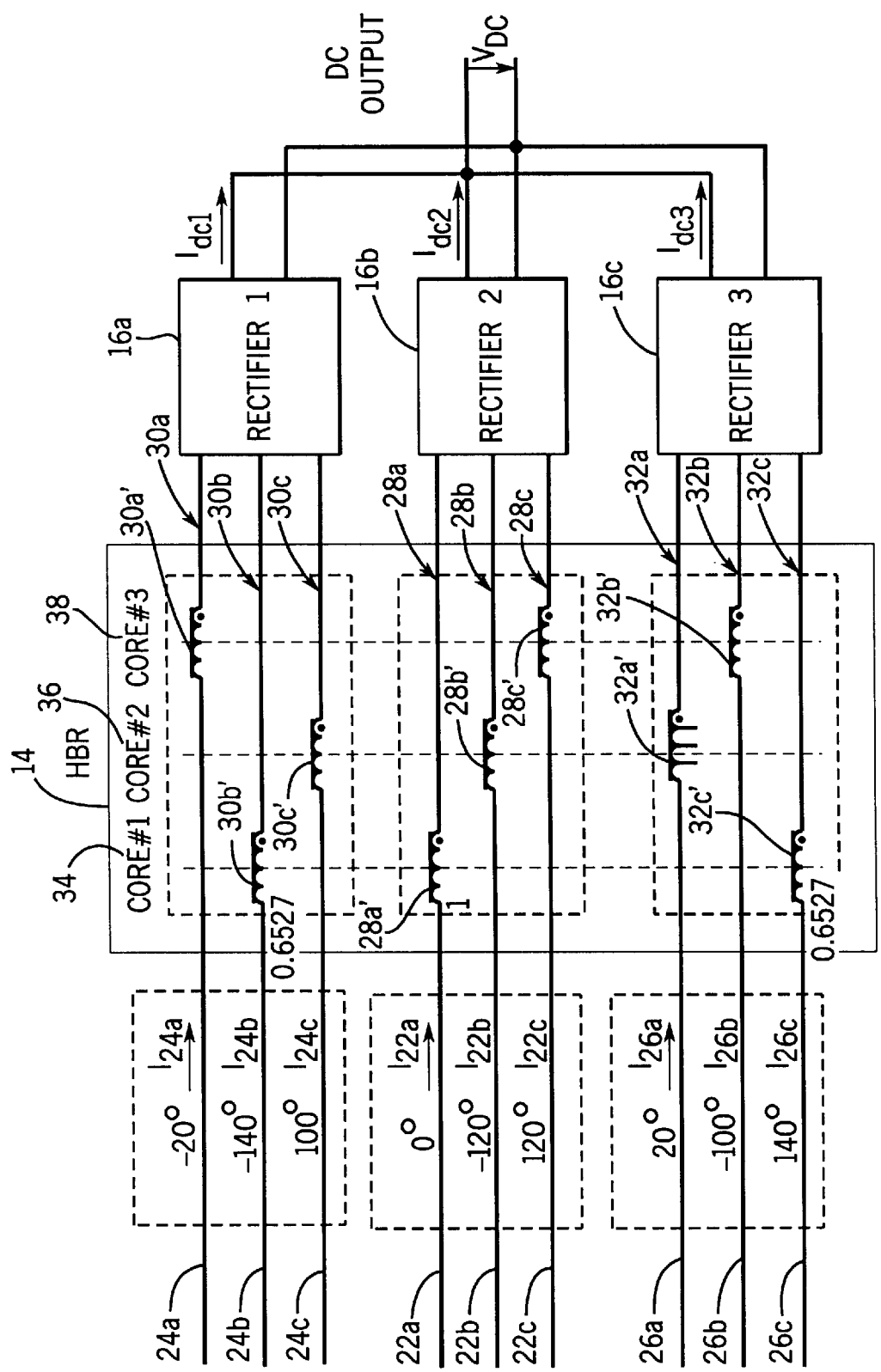
FIG. 9 is a block diagram of a second embodiment of a harmonic blocking reactor constructed in accordance with the present invention.

Referring now to FIG. 9, a second embodiment of a harmonic blocking reactor 14 constructed in accordance with the present invention is shown. The harmonic blocking reactor 14 of FIG. 9 again comprises three cores 34, 36, and 38, as well as three winding subsets 28, 30, and 32. Each winding subset again comprises first, second, and third windings 28a–c, 30a–c, and 32a–c, respectively, and each of the windings 28a–c, 30a–c, and 32a–c comprises a single coil 28a'–c', 30a'–c', and 32a'–c' respectively.

In this second embodiment, the first, second, and third ac signals 22a, 22b, and 22c are linked to the first, second, and third windings 28a, 28b, and 28c of the first winding subset 28. Similarly, the fourth, fifth, and sixth ac signals 24a, 24b, and 24c are linked to the first, second, and third windings 30a, 30b, and 30c of the second winding subset 30 and the seventh, eighth, and ninth ac signals 26a, 26b, and 26c are linked to the first, second, and third windings 32a, 32b, and 32c of the third winding subset 30. The first winding 28a from the winding subset 28, the second winding 30b from the winding subset 30, and the third winding 32c from the third winding subset 32 are each wound around the first core 34. The second winding 28b from the winding subset 28, the third winding 30c from the winding subset 30, and the first winding 32a from the third winding subset 32 are each wound around the second core 36. The third winding 28c from the winding subset 28, the first winding 30a from the winding subset 30, and the second winding 32b from the third winding subset 32 are each wound around the first core 36.

Referring again to FIG. 9, the ac signals coupled to the windings wound about each of the cores 34, 36, and 38 again include one ac signal from the first set of ac signals 22, one from the second set of ac signals 24, and one from the third set of ac signals 26. The ac signals from the second and third set of ac signals are selected to be the second closest signals to the ac signal from the first set of ac signals 22. For a predetermined angle of twenty degrees, the ac signals coupled to the windings wound about the core 34, for example, include the signals 22a (zero degrees), 24b (negative one hundred and forty degrees) and 26c (one hundred and forty degrees). The windings wound around the cores 36 and 38 each also comprise three ac signals offset from each other by an angle of one hundred and forty degrees.

Again, the harmonic blocking reactor cancels fundamental flux in each of the cores 34, 36, and 38. Consequently, according to equation 5, and as shown in FIG. 9, the winding turn ratio is:

$$\frac{N_{30b'}}{N_{28a'}} = \frac{N_{32a'}}{N_{28a'}} = \frac{1}{2\cos 140°} \approx 0.6527 \quad \text{Eq. 7}$$

Figure 10:
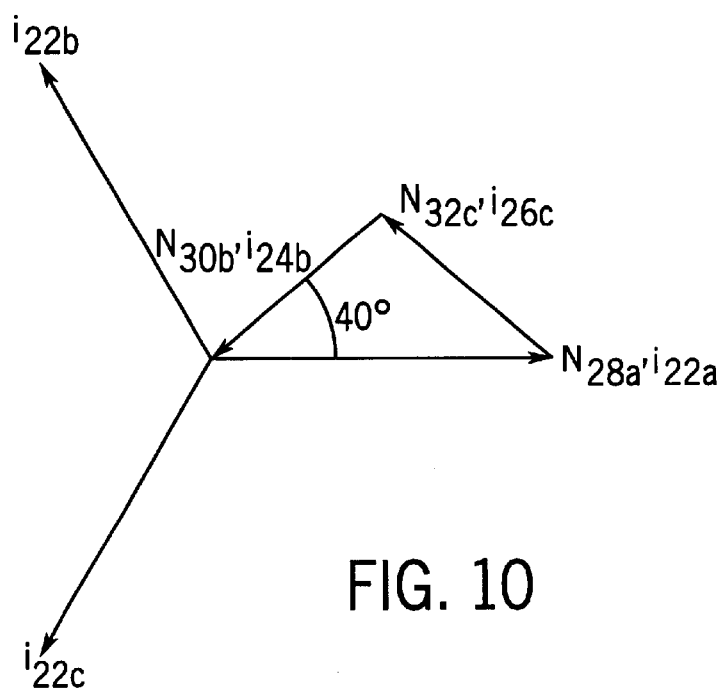
FIG. 10 is a vector diagram illustrating the amp turn linkage on a first core of the harmonic blocking reactor of FIG. 9.

Referring again to FIG. 10, in this situation, a flux linkage (or so-called ampere turns) function can be established as:

$$h(\text{freq}) = 0.6527 i_{24b} + i_{22a} + 0.6527 i_{26c} \quad \text{Eq. 8}$$

Table II shows the impedance values at each of the harmonic frequencies. As shown in Table II, zero impedance is applied by the harmonic blocking reactor 14 at the fundamental frequency. The construction of the harmonic blocking reactor 14 of FIG. 9, however, provides a substantial impedance toward the $3^{rd}$, $5^{th}$ and $13^{th}$ harmonics, although the impedance at other harmonic frequencies is lower than that exhibited by the harmonic blocking reactor of FIG. 7. So generally speaking, the construction of FIG. 7 provides a more substantial impedance to a broad spectra of harmonics, while the construction of FIG. 9 is particularly useful in applications which demonstrate excessive $5^{th}$ harmonics, and minimum other harmonics.

TABLE IV

Flux linkage for all low harmonics for construction according to Eq. 8

| Harmonics | 0.6527 $I_{26c}$ | $I_{22a}$ | 0.6527 $i_{24b}$ | h() |
|---|---|---|---|---|
| $1^{st}$ | 0.6527 ∠40° | 1 ∠0° | 0.6527 ∠−140° | 0 |
| $3^{rd}$ | 0.6527 ∠60° | 1 ∠0° | 0.6527 ∠−60° | 1.6527 |
| $5^{th}$ | 0.6527 ∠−20° | 1 ∠0° | 0.6527 ∠20° | 2.227 |
| $7^{th}$ | 0.6527 ∠−100° | 1 ∠0° | 0.6527 ∠100° | 0.773 |
| $9^{th}$ | 0.6527 ∠180° | 1 ∠0° | 0.6527 ∠−180° | −0.3054 |
| $11^{th}$ | 0.6527 ∠100° | 1 ∠0° | 0.6527 ∠−100° | 0.773 |
| $13^{th}$ | 0.6527 ∠20° | 1 ∠0° | 0.6527 ∠−20° | 2.227 |

Referring now to FIG. 11, a third embodiment of the harmonic blocking reactor 14 of the present invention is shown. Here, in order to provide a balanced impedance to all low level harmonics, the harmonic blocking reactor combines the features of the harmonic blocking reactors described with respect to the first (FIG. 7) and second (FIG. 9) embodiments above.

The harmonic blocking reactor 14 of FIG. 9 again comprises three cores 34, 36, and 38, as well as three winding subsets 28, 30, and 32. Each winding subset again comprises first, second, and third windings 28a–c, 30a–c, and 32a–c, respectively, and each of the windings 28a–c, 30a–c, and 32a–c comprises a first coil 28a'–c', 30a'–c', and 32a'–c', respectively. The second winding subset 30 and third winding subset 32 each also comprise a second coil 30a''–c'' and 32a''–c'', respectively, wherein each winding 30a–c and 32a–c comprises a first coil and a second coil coupled in series.

In the third embodiment, the first, second, and third ac signals 22a, 22b, and 22c are again linked to the first, second, and third windings 28a, 28b, and 28c of the first winding subset 28. Similarly, the fourth, fifth, and sixth ac signals 24a, 24b, and 24c are linked to the first, second, and third windings 30a, 30b, and 30c of the second winding subset 30 and the seventh, eighth, and ninth ac signals 26a, 26b, and 26c are linked to the first, second, and third windings 32a, 32b, and 32c of the third winding subset 30. The first winding 28a from the winding subset 28, the first coil 30a' from first winding 30a of the winding subset 30, the first coil 30b' from the second winding 30b of the winding subset 30, the first coil 32a' from the first winding 32a and the first coil 32c' from the third winding 32c are each wound around the first core 34. The second winding 28b from the winding subset 28, the second coil 30b'' from second winding 30b of the winding subset 30, the first coil 30c' from the third winding 30c of the winding subset 30, the second coil 32a'' from the first winding 32a and the first coil 32b' from the second winding 32b are each wound around the second core 36. The third winding 28c from the winding subset 28, the second coil 30a'' from first winding 30a of the winding subset 30, the second coil 30c'' from the third winding 30c of the winding subset 30, the second coil 32b'' from the second winding 32b and the second coil 32c'' from the third winding 32c are each wound around the third core 38.

Referring again to FIG. 11, the ac signals coupled to the windings wound about each of the cores 34, 36, and 38 again include one ac signal from the first set of ac signals 24, and two signals from the second and third sets of ac signals, 26 and 28 respectively. The ac signals from the second and third set of ac signals are selected to be both the closest and the second closest signals to the ac signal from the first set of ac signals 24. For a predetermined angle of twenty degrees, the ac signals coupled to the windings wound about the core 34, for example, include the signals 22a (zero degrees), 24a (negative twenty degrees), 24b (negative one hundred and forty degrees), 26a (twenty degrees) and 26c (negative one hundred and forty degrees). The windings wound around the cores 36 and 38 are constructed in a similar manner, as can be seen with reference to FIG. 9. The amp turn ratio of the coils wound about each of the cores 34, 36, and 38 is again selected to cancel fundamental flux in the respective core. For this embodiment, the flux linkage function is calculated as a vector sum of the flux linkages of equations 7 and 8 above, and is constructed as $$f(\text{freq}) = -0.532 i_{24a} + 0.6527_{24b} + 2 i_{22a} - 0.532_{26a} + 0.6527_{26c} \quad \text{Eq. 9}$$

Table III illustrates the impedance of the flux linkage of the embodiment of FIG. 9 against individual harmonics. Again, the harmonic blocking reactor 14 passes signals at the fundamental frequency while providing an impedance to higher harmonics.

TABLE III

Flux linkage for low frequency harmonics for the harmonic blocking reactor of FIG. 9

| Harmonics | $-0.532\, i1_{24a}$ | $0.6527\, i_{24b}$ | $I_{22a}$ | $-0.532\, i_{26a}$ | $0.6527\, i_{26c}$ | f ( ) |
|---|---|---|---|---|---|---|
| $1^{st}$  | $-0.532 \angle 20°$   | $0.6527 \angle 40°$   | $2 \angle 0°$ | $-0.532 \angle 20°$   | $0.6527 \angle -140°$ | 0 |
| $3^{rd}$  | $-0.532 \angle -60°$  | $0.6527 \angle 60°$   | $2 \angle 0°$ | $-0.532 \angle 60°$   | $0.6527 \angle -60°$  | 2.1206 |
| $5^{th}$  | $-0.532 \angle -100°$ | $0.6527 \angle -20°$  | $2 \angle 0°$ | $-0.532 \angle 100°$  | $0.6527 \angle 20°$   | 3.412 |
| $7^{th}$  | $-0.532 \angle -140°$ | $0.6527 \angle -100°$ | $2 \angle 0°$ | $-0.532 \angle 140°$  | $0.6527 \angle 100°$  | 2.5882 |
| $9^{th}$  | $-0.532 \angle -180°$ | $0.6527 \angle 180°$  | $2 \angle 0°$ | $-0.532 \angle 180°$  | $0.6527 \angle -180°$ | 1.7588 |
| $11^{th}$ | $-0.532 \angle 140°$  | $0.6527 \angle 100°$  | $2 \angle 0°$ | $-0.532 \angle -140°$ | $0.6527 \angle -100°$ | 2.5882 |
| $13^{th}$ | $-0.532 \angle 100°$  | $0.6527 \angle 20°$   | $2 \angle 0°$ | $-0.532 \angle -100°$ | $0.6527 \angle -20°$  | 3.412 |

It can be seen with reference to Table III that this configuration passes the fundamental frequency but presents a significant impedance to higher order harmonics. This configuration, therefore, is particularly useful when significant, broad harmonic noise is present.

It should be understood that the methods and apparatuses described above are only exemplary and do not limit the scope of the invention, and that various modifications could be made by those skilled in the art that would fall under the scope of the invention. For example, it will be apparent that a harmonic blocking reactor constructed in accordance with the present invention can be configured for use with a number of differently spaced nine phase systems. Furthermore, a harmonic blocking reactor constructed in accordance with the present invention can be used with power converter systems in which the rectifiers are coupled in parallel or series. Additionally, although the harmonic blocking reactor is shown to include a laminated steel core, it will be understood that a number of different known core configurations could be used. It will be apparent that other minor modifications and changes could be made to the configuration without departing from the scope of the invention. It will also be apparent to those of ordinary skill in the art that, although the topologies have been derived from the perspective of AC to DC conversion, the principles of the present invention can also be applied to nine-phase DC to AC system as well. Furthermore, although the examples here illustrate the construction of harmonic blocking reactors using nine-phase currents and three separate continuous flux paths, the principles of the present invention can be easily extended to larger multiphase systems (12, 15, 18, etc.). Nothing in this application is considered critical or essential to the present invention unless explicitly indicated as being critical or essential.

To apprise the public of the scope of this invention, the following claims are made:

What is claimed is:

1. A reactor for linking a transformer to a rectifier, the transformer generating a multiphase AC output signal comprising a plurality of three phase signals, each of the three phase signals comprising a first, a second and a third output current of substantially similar magnitude, each of the first, second, and third output currents being spaced one hundred and twenty degrees apart, wherein the first, second, and third output currents of each of the three phase signals are offset from the first, second, and third output currents of another of the three phase signals by a predetermined angle, respectively, and the rectifier is for receiving and rectifying the multiphase AC output signals to provide positive and negative DC bus currents, the reactor comprising:

first, second and third cores; and a plurality of winding subsets, the plurality of winding subsets being equal in number to the plurality of three phase signals, each winding subset including at least first, second and third windings linked to the first, second and third outputs of the corresponding three phase signal, the windings being arranged on the cores such that at least a winding segment from each of the plurality of winding subsets is wound about each of the first, second and third cores.

2. The reactor of claim 1 wherein the AC currents are provided at a fundamental frequency, current passing through each winding generates flux within the core and the winding segments on each core are sized and arranged such that the fundamental fluxes through the core cancel.

3. The reactor of claim 1, for linking a three to nine phase transformer to a rectifier, the transformer generating nine AC outputs, the first, second and third output currents spaced one hundred and twenty degrees apart, the fourth, fifth and sixth output currents leading the first, second and third output currents by a predetermined angle, respectively, the seventh, eighth and ninth output currents lagging the first, second and third output currents by substantially the predetermined angle, respectively, wherein the reactor comprises first, second, and third winding subsets, the first winding subset including at least first, second and third windings linked to the first, second and third outputs, the second winding subset including at least first, second and third windings linked to the fourth, fifth and sixth outputs and the third winding subset including at least first, second and third windings linked to the seventh, eighth and ninth outputs, and the windings are arranged on the cores such that at least a coil from each of the first, second and third winding subsets is wound about each of the first, second and third cores.

4. The reactor of claim 3 wherein each of the first, second and third subset first windings are wound about the first core, the first, second and third subset second windings are wound about the second core and the first, second and third subset third windings are wound about the third core.

5. The reactor of claim 3 wherein the predetermined angle is substantially 20 degrees and the ratio of first subset windings to second and third subset windings on each core is substantially 1:0.532:0.532.

6. The reactor of claim 3 wherein each winding comprises a single coil, and the ratio of the first subset windings to the second and third subset windings on each core is one to one over two times the cosine of the predetermined angle.

7. The reactor of claim 3 wherein the first subset first winding, the second subset second winding and the third subset third winding are wound about the first core, the first subset second winding, the second subset third winding and the third subset first winding are wound about the second core and the first subset third winding, the second subset first winding and the third subset second winding are wound about the third core.

8. The reactor of claim 3 wherein the predetermined angle is substantially 20 degrees and the ratio of first subset windings to second and third subset windings on each core is substantially 1:0.6527:0.6527.

9. The reactor of claim 3 wherein each second and third subset winding includes first and second coils wound on different cores.

10. The reactor of claim 9 wherein the first subset first winding, second subset first winding first coil, second subset second winding first coil, third subset first winding first coil and third subset third winding first coil are wound about the first core, the first subset second winding, second subset second winding second coil, second subset third winding first coil, third subset first winding second coil and third subset second winding first coil are wound about the second core, the first subset third winding, second subset first winding second coil, second subset third winding second coil, third subset second winding second coil and third subset third winding second coil are wound about the third core.

11. The reactor of claim 10 wherein the turns ratios of the first subset first winding to the second subset first winding first coil, second subset second winding first coil, third subset first winding first coil and third subset third winding first coil are two to one over two times the cosine of the phase angle between the current linked to the first subset first winding and the current linked to the respective coil, the turns ratios of the first subset second winding to the second subset second winding second coil, second subset third winding first coil, third subset first winding second coil and third subset second winding first coil are two to one over two times the cosine of the phase angle between the current linked to the first subset second winding and the current linked to the respective coil and the turns ratios of the first subset third winding to the second subset first winding second coil, second subset third winding second coil, third subset second winding second coil and third subset third winding second coil are two to one over two times the cosine of the phase angle between the current linked to the first subset first winding and the current linked to the respective coil.

12. The reactor of claim 9 wherein the predetermined phase angle is 20 degrees and the turns ratio of the first subset first winding to second subset first winding first coil and second winding first coil is substantially 2:0.532:0.6527, respectively, the turns ratio of the first subset first winding to third subset first winding first coil and third winding first coil is substantially 2:0.532:0.6527, the turns ratio of the first subset second winding to second subset second winding second coil and third winding first coil is substantially 2:0.532:0.6527, respectively, the turns ratio of the first subset second winding to third subset first winding second coil and second winding first coil is substantially 2:0.532:0.6527, the turns ratio of the first subset third winding to second subset first winding second coil and third winding second coil is substantially 2:0.6527:0.532, respectively, and the turns ratio of the first subset third winding to third subset second winding second coil and third winding second coil is substantially 2:0.6527:0.532.

13. The reactor of claim 1 wherein each core forms at least one continuous flux path.

14. The reactor of claim 1 where the first, second and third cores form first, second and third limbs on a four limb core configuration, each limb including first and second ends, each of the first ends linked and each of the second ends linked.

15. A method for linking a transformer to a rectifier, the transformer generating AC output currents having substantially similar magnitudes on each of nine outputs, the first, second and third output currents spaced one hundred and twenty degrees apart, the fourth, fifth and sixth output currents leading the first, second and third output currents by a predetermined angle, respectively, the seventh, eighth and ninth output currents lagging the first, second and third output currents by substantially the predetermined angle, respectively, the rectifier for receiving and rectifying nine phase AC currents to provide positive and negative DC bus currents, the method comprising the steps of:

providing first, second and third cores; and linking a first end of each winding in a first winding subset including at least first, second and third windings to the first, second and third outputs;

linking a first end of each winding in a second winding subset including at least first, second and third windings to the fourth, fifth and sixth outputs;

linking a first end of each winding in a third winding subset including at least first, second and third windings to the seventh, eighth and ninth outputs;

arranging the windings on the cores such that at least a winding segment from each of the first, second and third winding subsets is wound about each of the first, second and third cores; and linking a second end of each winding to the rectifier.

16. The method of claim 15 wherein the AC currents are provided at a fundamental frequency, current passing through each winding generates flux within the core and wherein the step of arranging includes selecting the windings such that the fundamental fluxes through the core cancel.

17. The method of claim 16 wherein each winding segment includes the entire winding, the ratio of the first subset windings to the second and third subset windings on each core is one to one over two times the cosine of the predetermined angle.

18. The method of claim 16 wherein each of the first, second and third subset first windings are wound about the first core, the first, second and third subset second windings are wound about the second core and the first, second and third subset third windings are wound about the third core.

19. The method of claim 16 wherein the first subset first winding, the second subset second winding and the third subset third winding are wound about the first core, the first subset second winding, the second subset third winding and the third subset first winding are wound about the second core and the first subset third winding, the second subset first winding and the third subset second winding are wound about the third core.

20. The method of claim 16 wherein the step of arranging includes arranging each second and third subset winding so that the winding includes first and second coils wound on different cores.

21. The method of claim 20 wherein the step of arranging includes winding the first subset first winding, second subset first winding first coil, second subset second winding first coil, third subset first winding first coil and third subset third winding first coil about the first core, the first subset second winding, second subset second winding second coil, second subset third winding first coil, third subset first winding second coil and third subset second winding first coil about the second core, the first subset third winding, second subset first winding second coil, second subset third winding second coil, third subset second winding second coil and third subset third winding second coil about the third core.

22. The method of claim 21 wherein the step of arranging further includes selecting the turns ratios of the first subset first winding to the second subset first winding first coil, second subset second winding first coil, third subset first winding first coil and third subset third winding first coil to be two to one over two times the cosine of the phase angle between the current linked to the first subset first winding and the current linked to the respective coil, the turns ratios of the first subset second winding to the second subset second winding second coil, second subset third winding first coil, third subset first winding second coil and third subset second winding first coil to be two to one over two times the cosine of the phase angle between the current linked to the first subset second winding and the current linked to the respective coil and the turns ratios of the first subset third winding to the second subset first winding second coil, second subset third winding second coil, third subset second winding second coil and third subset third winding second coil to be two to one over two times the cosine of the phase angle between the current linked to the first subset first winding and the current linked to the respective coil.

23. The method of claim 15 where the first, second and third cores form first, second and third limbs on a four limb core configuration, each limb including first and second ends, each of the first ends linked and each of the second ends linked.

24. A reactor for linking a transformer to a rectifier, the transformer generating AC output currents having substantially similar magnitudes on each of nine outputs, the first, second and third output currents spaced one hundred and twenty degrees apart, the fourth, fifth and sixth output currents leading the first, second and third output currents by a predetermined angle, respectively, the seventh, eighth and ninth output currents lagging the first, second and third output currents by substantially the predetermined angle, respectively, the rectifier for receiving and rectifying nine phase AC currents to provide positive and negative DC bus currents, the reactor comprising:

first, second and third cores; and
a first winding subset including at least first, second and third windings linked to the first, second and third outputs, a second winding subset including at least first, second and third windings linked to the fourth, fifth and sixth outputs and a third winding subset including at least first, second and third windings linked to the seventh, eighth and ninth outputs, the windings arranged on the cores such that a winding from each of the first, second and third winding subsets is wound about each of the first, second and third cores, where the ratio of the first subset windings to the second and third subset windings on each core is one to one over two times the cosine of the phase angle between the current linked to the first subset winding and the current linked to the second subset winding wound about the same core such that fundamental fluxes through the cores cancel.

25. The reactor of claim 24 wherein each of the first, second and third subset first windings are wound about the first core, the first, second and third subset second windings are wound about the second core and the first, second and third subset third windings are wound about the third core.

26. The reactor of claim 24 wherein the first subset first winding, the second subset second winding and the third subset third winding are wound about the first core, the first subset second winding, the second subset third winding and the third subset first winding are wound about the second core and the first subset third winding, the second subset first winding and the third subset second winding are wound about the third core.

* * * * *